(12) United States Patent
Adamski

(10) Patent No.: US 8,746,787 B2
(45) Date of Patent: Jun. 10, 2014

(54) ROOF FRAME FOR A MOTOR VEHICLE

(71) Applicant: Dr. Ing. h.c.F. Porsche Aktiengesellschaft, Stuttgart (DE)

(72) Inventor: Pawel Adamski, Wildberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/933,481

(22) Filed: Jul. 2, 2013

(65) Prior Publication Data

US 2014/0008940 A1      Jan. 9, 2014

(30) Foreign Application Priority Data

Jul. 3, 2012   (DE) .......................... 10 2012 105 882

(51) Int. Cl.
*B60J 10/02*         (2006.01)
(52) U.S. Cl.
USPC ....................................... 296/210; 296/96.21
(58) Field of Classification Search
USPC ................................ 296/210, 192, 201, 96.21
See application file for complete search history.

(56) References Cited

U.S. PATENT DOCUMENTS

| | | | |
|---|---|---|---|
| 5,018,781 A * | 5/1991 | Kumasaka et al. | ........... 296/210 |
| 5,092,649 A | 3/1992 | Wurl | |
| 5,213,391 A | 5/1993 | Takagi | |
| 6,578,909 B1 | 6/2003 | Reed et al. | |
| 8,042,863 B2 | 10/2011 | Nydam | |

FOREIGN PATENT DOCUMENTS

| | | |
|---|---|---|
| DE | 40 18 592 | 12/1991 |
| DE | 10 2004 029 278 | 1/2006 |
| DE | 60 2004 003 185 | 9/2007 |
| DE | 10 2010 019 827 | 12/2010 |

OTHER PUBLICATIONS

German Search Report of Feb. 4, 2013.

* cited by examiner

*Primary Examiner* — Joseph Pape
(74) *Attorney, Agent, or Firm* — Gerald E. Hespos; Michael J. Porco; Matthew T. Hespos

(57) ABSTRACT

A roof frame for a motor vehicle has a cowl frame with upper and lower segments and a plurality of chambers in each segment. An upper connecting surface is on top side of the free end of the lower segment. A lower connecting surface is opposite the upper connecting surface and is connected to a reinforcing element of an A pillar. The upper segment is arranged offset back from the lower segment of the cowl frame and is shortened by mechanical machining to form a step-shaped shoulder in which the outer roof frame is held.

14 Claims, 6 Drawing Sheets

ROOF FRAME FOR A MOTOR VEHICLE

CROSS REFERENCE TO RELATED APPLICATION

This application claims priority under 35 USC 119 to German Patent Appl. No. 10 2012 105 882.2 filed on Jul. 3, 2012, the entire disclosure of which is incorporated herein by reference.

BACKGROUND

1. Field of the Invention

The invention relates to a roof frame for a motor vehicle.

2. Description of the Related Art

DE 10 2010 019 827 A1 discloses a roof arrangement for a vehicle. The roof arrangement has a roof bow in the form of an extruded profile that runs transversally. The roof bow has an end region that is pressed flat and is connectable to a roof frame. DE 40 18 592 A1 discloses a roof cross member that consists of a multi-chamber profile in the form of an extruded profile.

An object of the invention is to provide a roof frame for a motor vehicle with a cowl frame that ensures a stable connection of an outer side part and of a reinforcing element for the A pillar and for an inner roof frame.

SUMMARY OF THE INVENTION

The invention relates to a simple connection of outer and inner roof frames and for the reinforcement of the A pillar. More particularly, the invention uses a specially designed cowl frame with a cowl profile with upper and lower segments arranged one above the other and chambers within the upper and lower segments. The upper segment of the cowl frame is offset back from the lower segment at each end of the cowl frame. Thus, each end of the cowl frame defines a stepped shoulder with the lower segment projecting farther than the upper segment. Accordingly, the lower segment has a free end with an upper connecting surface for receiving an extension of the outer roof frame. The free end of the lower segment also has a lower connecting surface for engaging the reinforcing element of an A pillar. In particular, the upper segment of the cowl frame can be shortened by mechanical machining to form the connecting surface on the lower segment. The mechanical machining can be undertaken by removal of an end part of the upper segment by milling.

The step-shaped shoulder is defined by the connecting surface on the lower segment of the cowl frame and by the end of the upper segment. The protruding extension of the outer roof frame is positioned by and connected to the step shaped shoulder.

The chambers in the two segments of the cowl frame are arranged between upper and lower walls of the segments and are formed by longitudinal webs that are configured in a V-shaped manner. The webs are formed continuously, and are arranged so that three chambers are located next to one another and two chambers are arranged one above the other. Thus six chambers are arranged in the two segments of the cowl frame and contribute substantially to the stability of the cowl frame.

The lower segment of the cowl frame is formed integrally or unitarily with projecting limbs. The projecting limbs extend laterally from the lower segment and run longitudinally along the length of the cowl frame, which is the transverse direction of the vehicle. The projecting limbs of the cowl frame are connected to limbs of the reinforcing element for the A pillar and support a roof section. The reinforcing element is arranged in a form-fitting manner with respect to the lower segment and therefore is kept in position. A reinforced junction is formed in the connecting region at the free end of the cowl frame from the extension on the outer roof frame, the connecting surface on the lower segment and the reinforcing element of the A pillar.

An exemplary embodiment of the invention is illustrated in the drawings and described in more detail below.

DETAILED DESCRIPTION OF THE PREFERRED EMBODIMENTS

Figure 1:
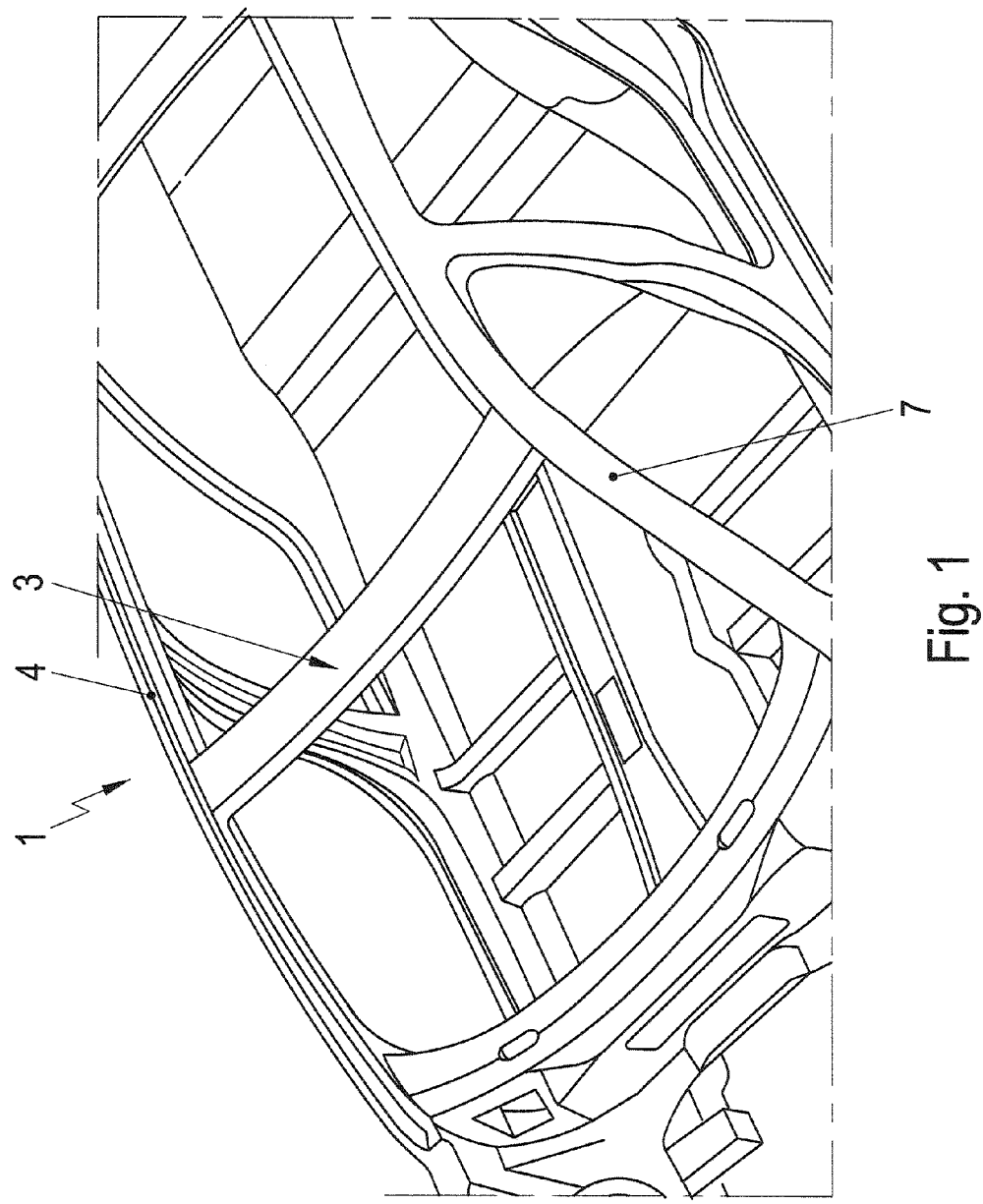
FIG. 1 is a top perspective view of a cowl frame on a partially completed vehicle.
Figure 2:
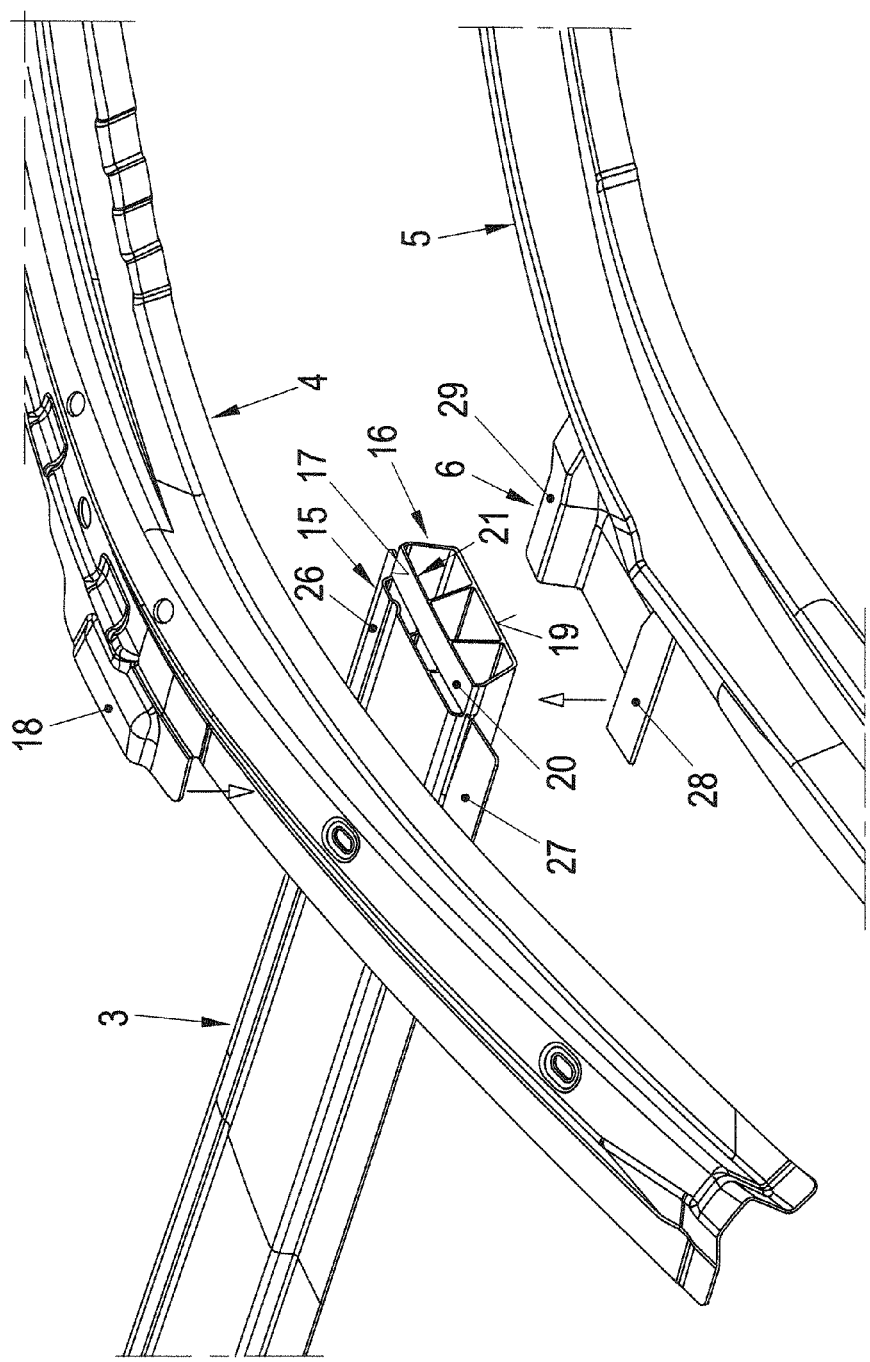
FIG. 2 is an exploded perspective view of the cowl frame with outer and inner roof frames and a reinforcing element for the A pillar.
Figure 3:
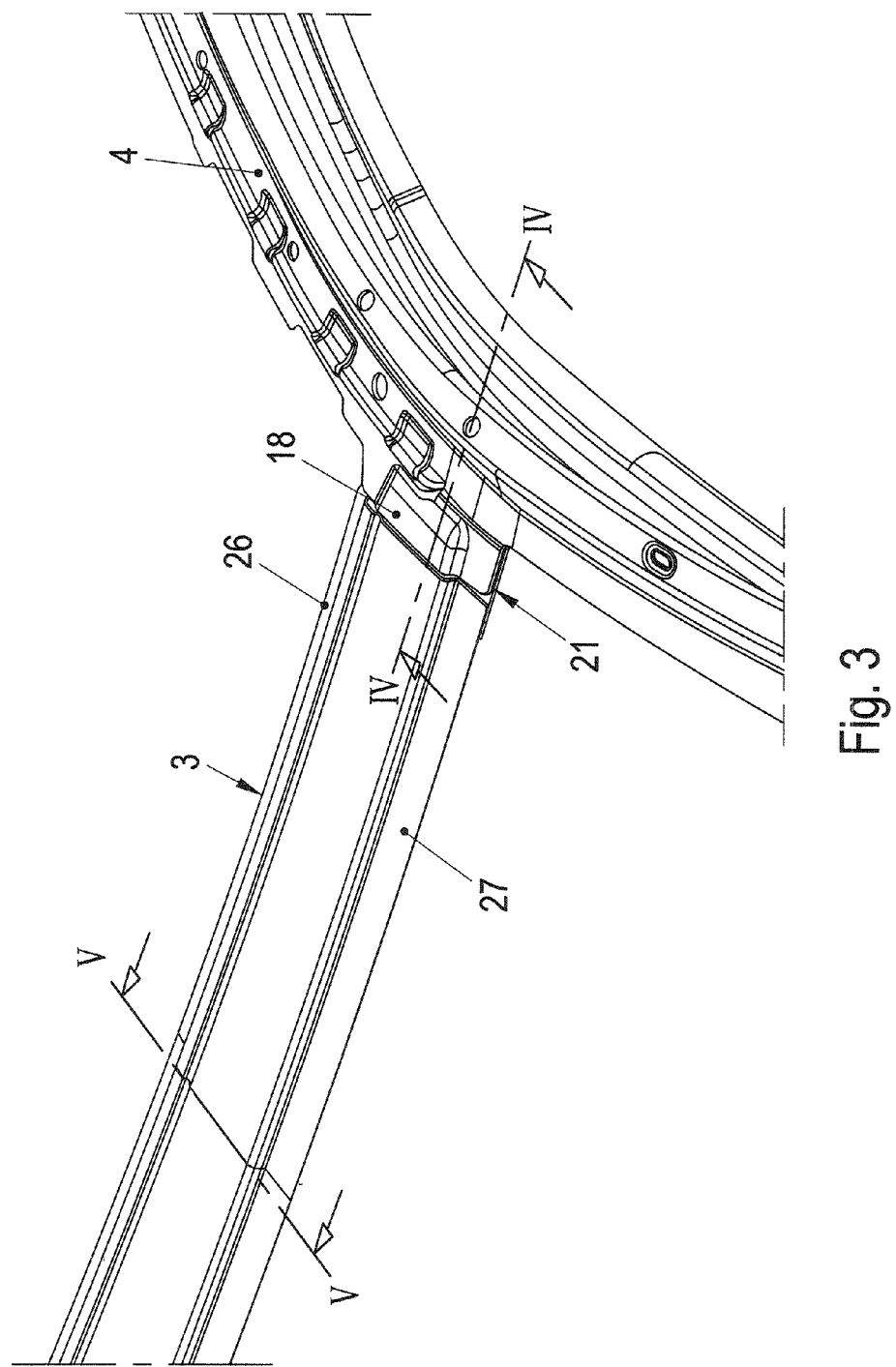
FIG. 3 is a perspective view of the assembled cowl frame of FIG. 2.
Figure 4:
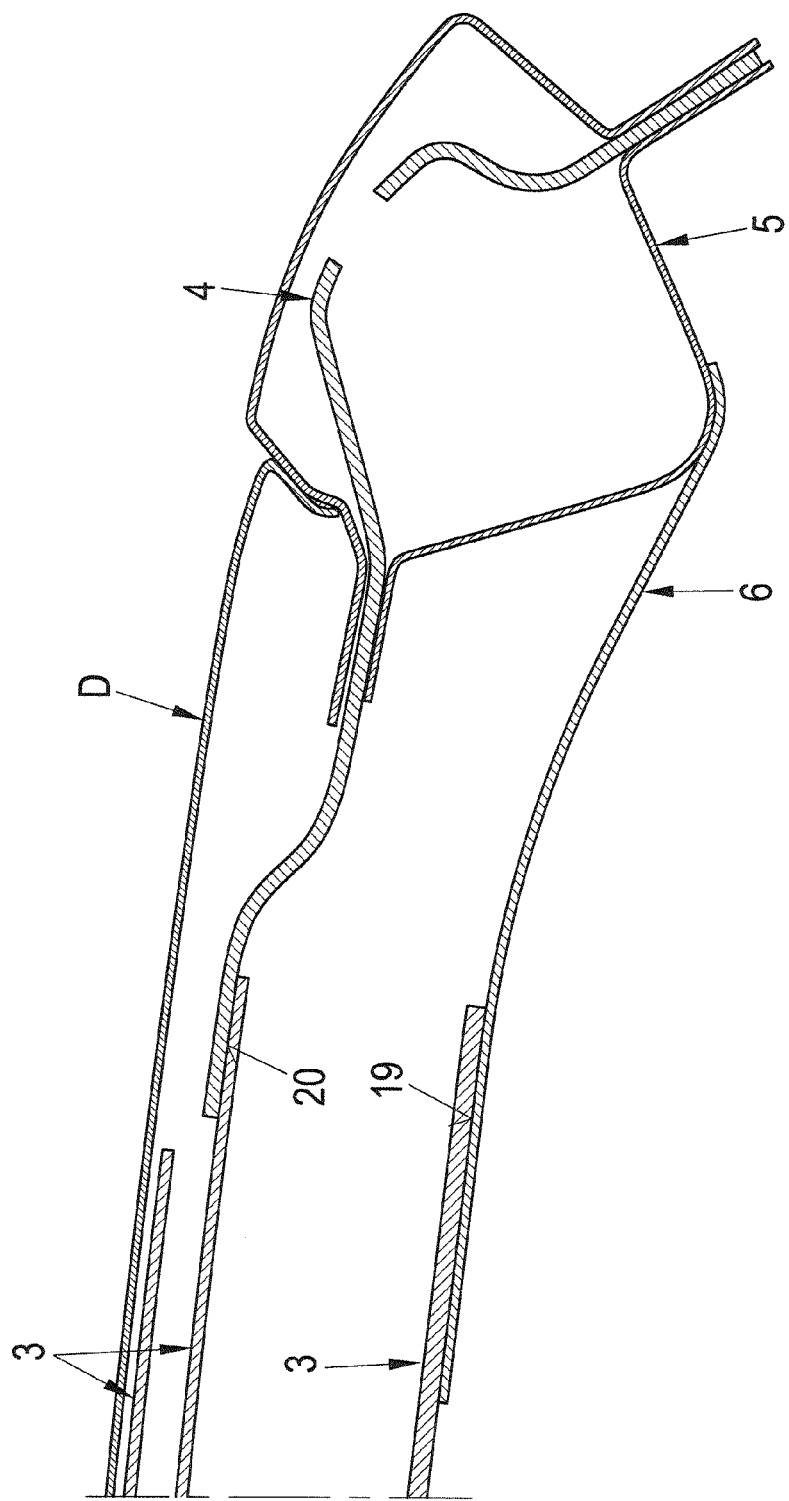
FIG. 4 is a cross-section taken along line IV-IV in FIG. 3.
Figure 5:
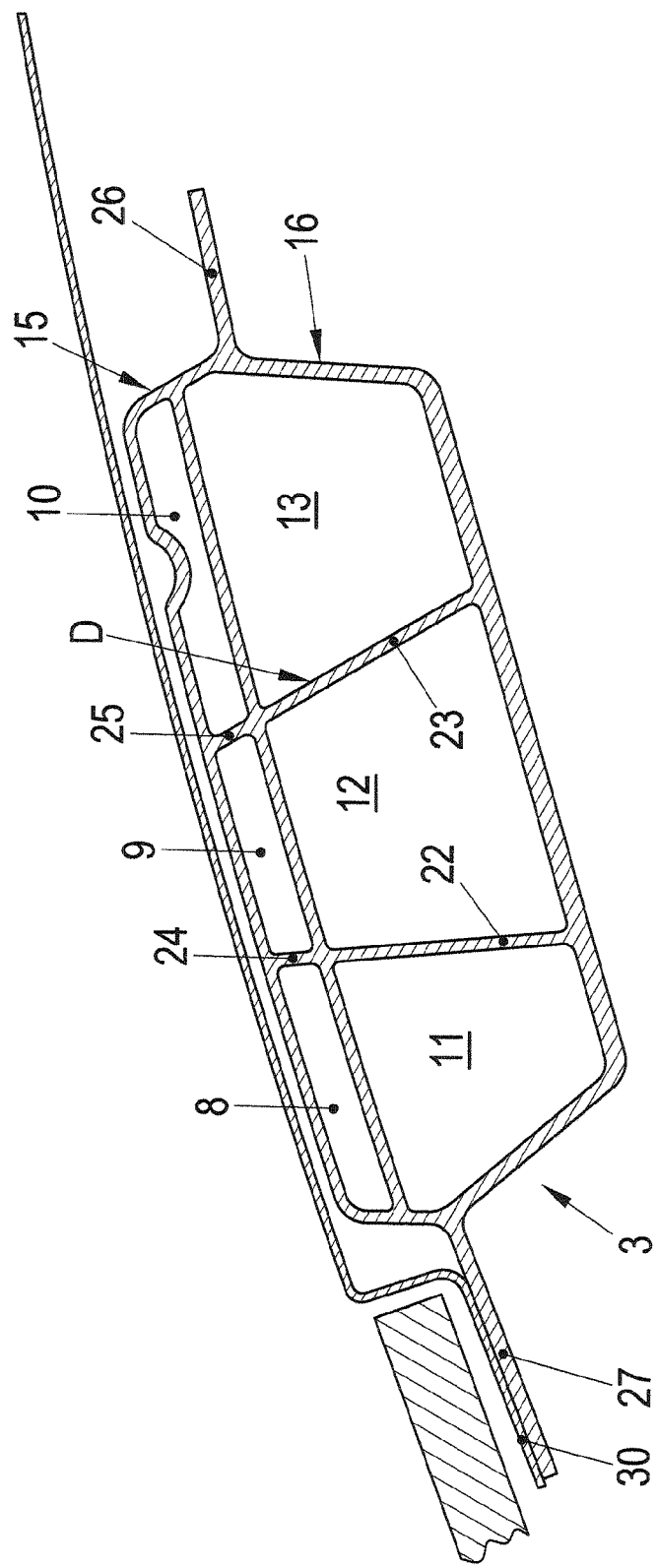
FIG. 5 is a cross-section taken along line V-V in FIG. 3.
Figure 6:
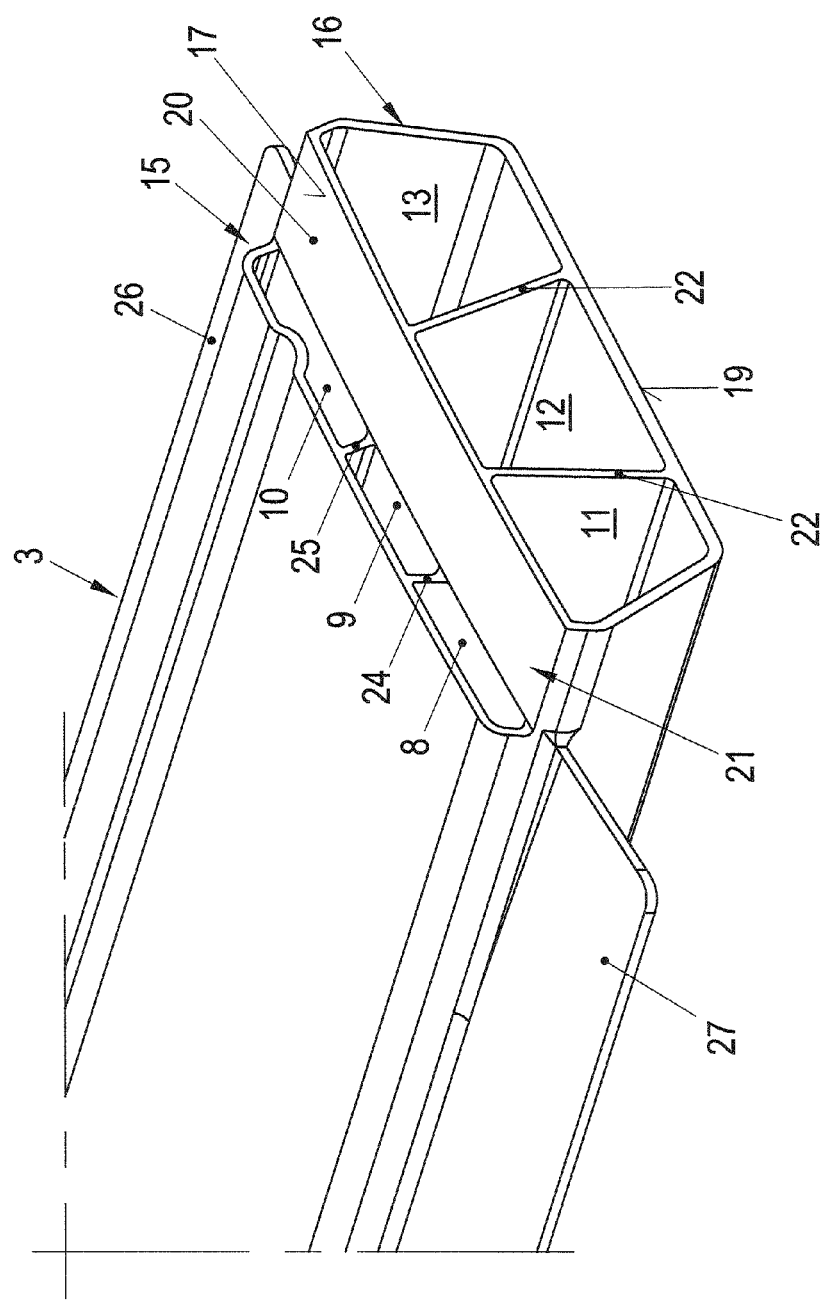
FIG. 6 is a perspective view of the cowl frame with the two segments and six chambers.

A roof frame 1 for a vehicle 2 comprises a cowl frame 3 lying transversely, outer and inner roof frames 4, 5 connected to the cowl frame 3, and a reinforcing element 6 for an A pillar 7.

The cowl frame 3 comprises a cowl profile with a plurality of laterally adjacent upper chambers 8 to 10 and laterally adjacent lower chambers 11 to 13 defined respectively within upper and lower segments 15 and 16.

The lower segment 16 of the cowl frame 3 has a free end 17 with opposite lower and upper connecting surfaces 19 and 20. An extension 18 of the outer roof frame 4 is engaged on the upper connecting surface 20. The lower connecting surface 19 of the lower segment 16 engages with the reinforcing profile 6 of the A pillar 7.

The upper segment 15 of the cowl frame 3 is designed to be shortened in relation to the lower segment 16 to form a step-shaped shoulder 21 that includes the upper connecting surface 20. The upper segment 15 can be shortened by milling off or by a similar mechanical process.

The laterally adjacent chambers 11 to 13 of the lower segment 16 are formed by upright longitudinal webs 22, 23 that converge toward one another at higher positions. Similarly, the laterally adjacent upper chambers 8 to 10 of the upper segment 15 are formed by upright longitudinal webs 24, 25 that converge toward one another at higher positions.

The inner roof frame 5 is held and fastened between the outer roof frame 4 and the reinforcing element 6 for the A pillar 7.

Limbs 26, 27 project unitarily out from the lower segment 16 of the cowl frame 3 and extend in the longitudinal direction of the chambers 8-13 and hence in the transverse direction of the vehicle. The reinforcing element 6 for the A pillar 7 has limbs 28 and 29 that are attached to the limbs 26 and 27 of the cowl frame 3 from below. A roof section 30 of the roof D can be fixed to the limb 27.

The outer roof frame 4, the inner roof frame 5 and the reinforcing element 6 for the A pillar 7 preferably are steel sheets. Alternatively, the outer roof frame 4 can be a steel sheet and the inner roof frame 5 and the reinforcing element 6 can be aluminum sheets. As a further alternate, the outer and the inner roof frames 4, 5 and also the reinforcing element 6 all can be formed from aluminum sheets.

What is claimed is:

1. A roof frame for a motor vehicle, comprising:
   outer and inner lateral roof frames on each lateral side of the vehicle;
   reinforcing elements for A pillars connected to the inner lateral roof frame; and
   a cowl frame extending in a lateral direction of the motor vehicle between the outer and inner lateral roof frames on each of the lateral sides of the vehicle, the cowl frame having upper and lower segments arranged one above the other, each of the upper and lower segments being formed with a plurality of chambers, the lower segment extending farther in the lateral direction of the motor vehicle than the upper segment, upper connecting surfaces being defined on ends of the lower segment projecting beyond the upper segment and being connected to extensions of the outer roof frame, lower connecting surfaces formed on the lower segment opposite the upper connecting surfaces and being connected to the reinforcing element of the A pillar.

2. The roof frame of claim 1, wherein ends of the upper segment are offset inward from ends of the lower segment to define step-shaped shoulders on ends of the cowl frame, the connecting surfaces being on the shoulders.

3. The roof frame of claim 2, wherein the upper segment is shortened by mechanical machining to form the connecting surfaces on the lower segment.

4. The roof frame of claim 2, wherein the chambers in each of the upper and lower segments of the cowl frame are separated from one another by longitudinal webs.

5. The roof frame of claim 4, wherein the longitudinal webs converge toward one another at higher positions on the cowl frame.

6. The roof frame of claim 1, wherein the inner roof frame is arranged between the outer roof frame and the reinforcing element for the A pillar.

7. The roof frame of claim 1, wherein the lower segment further comprises front and rear projecting limbs integrally formed to project from front and rear sides of the cowl frame and to run in the lateral direction of the motor vehicle, the reinforcing element for the A pillar having front and rear limbs nested with and connected respectively to the front and rear limbs of the lower segment from below, and a roof section being supported on an upper side of the front limb of the cowl frame.

8. A cowl frame for a motor vehicle, the cowl frame having opposite left and right ends, a bottom wall extending between the ends, a top wall substantially parallel to the bottom wall and having opposite ends spaced inward from the left and right ends of the cowl frame, an intermediate wall between the top and bottom walls and extending between the left and right ends of the cowl frame, front and rear walls joining the upper, lower and intermediate walls, the intermediate wall having a left upper connecting surface adjacent the left end of the cowl frame and a right upper connecting surface adjacent the right end of the cowl frame, lower webs between the lower and intermediate walls and extending between the left and right ends of the cowl frame, lower chambers between the lower and intermediate walls and on opposite sides of the lower webs, upper webs between the upper and intermediate walls and extending between the left and right ends of the upper wall, upper chambers between the upper and intermediate walls and on opposite sides of the upper webs.

9. The cowl frame of claim 8, wherein the lower chambers extend continuously between the ends of the cowl frame.

10. The cowl frame of claim 9, wherein the upper chambers extend continuously between the ends of the upper wall.

11. The cowl frame of claim 10, wherein each of the upper webs is substantially aligned with one of the lower webs.

12. The cowl frame of claim 11, wherein the upper webs slope toward one another at positions closer to the upper wall and the lower webs slope toward one another at positions closer to the intermediate wall.

13. The cowl frame of claim 8, further comprising front and rear limbs projecting from the front and rear walls at positions between the intermediate wall and the lower wall.

14. The cowl frame of claim 8 wherein the cowl frame is formed unitarily of metal.

* * * * *